United States Patent
Blankenship et al.

(10) Patent No.: US 10,231,150 B2
(45) Date of Patent: *Mar. 12, 2019

(54) SENDING DATA RATE INFORMATION TO A WIRELESS ACCESS NETWORK NODE

(71) Applicant: BlackBerry Limited, Waterloo (CA)

(72) Inventors: Yufei Wu Blankenship, Kildeer, IL (US); Shiwei Gao, Nepean (CA); Zhijun Cai, Ashburn, VA (US); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,190

(22) Filed: Sep. 12, 2016

(65) Prior Publication Data

US 2017/0070915 A1    Mar. 9, 2017

Related U.S. Application Data

(63) Continuation of application No. 13/789,931, filed on Mar. 8, 2013, now Pat. No. 9,444,745.

(51) Int. Cl.
*H04W 4/00* (2018.01)
*H04W 28/22* (2009.01)
*H04W 76/16* (2018.01)
*H04W 28/08* (2009.01)
*H04L 12/813* (2013.01)
*H04L 12/803* (2013.01)

(52) U.S. Cl.
CPC ............ *H04W 28/22* (2013.01); *H04L 47/20* (2013.01); *H04W 28/08* (2013.01); *H04W 76/16* (2018.02); *H04L 47/125* (2013.01)

(58) Field of Classification Search
CPC .. H04W 76/026; H04W 28/08; H04L 47/125; H04L 47/20
See application file for complete search history.

(56) References Cited

U.S. PATENT DOCUMENTS 8,085,731 B2 *  12/2011  Zhao ................... H04W 28/22
                                                 370/331
9,173,147 B2    10/2015  Gao et al.
(Continued)

FOREIGN PATENT DOCUMENTS

EP     2106076       9/2009
EP     2622901       9/2010
(Continued)

OTHER PUBLICATIONS

3GPP TS 36.300 V11.4.0 Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Dec. 2012) (208 pages).
(Continued)

*Primary Examiner* — Yemane Mesfin
*Assistant Examiner* — Abdelillah Elmejjarmi
(74) *Attorney, Agent, or Firm* — Trop, Pruner & Hu, P.C.

(57) ABSTRACT

A first wireless access network node sets a data rate for communication of data between a second wireless access network node and a user equipment (UE) that is concurrently connected to the first wireless access network node and the second wireless access network node. The first wireless access network node sends information relating to the data rate to the second wireless access network node for use by the second wireless access network node in controlling data communication between the second wireless access network node and the UE.

17 Claims, 4 Drawing Sheets

(56) References Cited

U.S. PATENT DOCUMENTS

| | | | |
|---|---|---|---|
| 2008/0207170 A1 | 8/2008 | Khetawat et al. | |
| 2008/0267146 A1 | 10/2008 | Lewis | |
| 2008/0268833 A1 | 10/2008 | Huang et al. | |
| 2009/0052350 A1 | 2/2009 | Chen et al. | |
| 2009/0238207 A1* | 9/2009 | Zhao | H04W 28/22 370/468 |
| 2009/0307556 A1 | 12/2009 | Cai et al. | |
| 2009/0310487 A1 | 12/2009 | Eriksson | |
| 2010/0182950 A1 | 7/2010 | Sexton | |
| 2010/0296487 A1 | 11/2010 | Karaoguz et al. | |
| 2010/0296497 A1 | 11/2010 | Karaoguz et al. | |
| 2010/0296498 A1 | 11/2010 | Karaoguz et al. | |
| 2010/0296499 A1 | 11/2010 | Karaoguz et al. | |
| 2010/0322227 A1 | 12/2010 | Luo | |
| 2011/0105144 A1 | 5/2011 | Siomina et al. | |
| 2011/0158171 A1 | 6/2011 | Centonza et al. | |
| 2011/0170506 A1* | 7/2011 | Zisimopoulous | H04L 47/14 370/329 |
| 2011/0216712 A1 | 9/2011 | Yang et al. | |
| 2011/0256880 A1* | 10/2011 | Golaup | H04W 28/08 455/453 |
| 2012/0002564 A1 | 1/2012 | Sexton | |
| 2012/0122424 A1 | 5/2012 | Herscovici et al. | |
| 2012/0165018 A1* | 6/2012 | Zhao | H04W 28/22 455/436 |
| 2012/0252524 A1 | 10/2012 | Gora et al. | |
| 2012/0294278 A1 | 11/2012 | Wang et al. | |
| 2012/0322450 A1 | 12/2012 | Karaoguz et al. | |
| 2013/0114408 A1* | 5/2013 | Sastry | H04W 28/02 370/231 |
| 2013/0137469 A1* | 5/2013 | Schmidt | H04W 74/006 455/466 |
| 2013/0143569 A1 | 6/2013 | Kapoor et al. | |
| 2013/0165084 A1* | 6/2013 | Xu | H04L 67/02 455/414.1 |
| 2013/0188527 A1* | 7/2013 | Yang | H04W 28/22 370/259 |
| 2013/0225193 A1 | 8/2013 | Lee et al. | |
| 2014/0003297 A1* | 1/2014 | Uusitalo | H04W 28/0231 370/259 |
| 2014/0010207 A1* | 1/2014 | Horn | H04W 36/165 370/332 |
| 2014/0036664 A1 | 2/2014 | Han et al. | |
| 2014/0177840 A1 | 6/2014 | Liu | |
| 2014/0219248 A1 | 8/2014 | Reddiboyana et al. | |
| 2014/0269632 A1 | 9/2014 | Blankenship et al. | |
| 2016/0050652 A1* | 2/2016 | Wu | H04L 5/001 370/329 |

FOREIGN PATENT DOCUMENTS

| | | | |
|---|---|---|---|
| EP | 2273804 | 1/2011 | |
| EP | 2753035 | 12/2012 | |
| WO | 2009023794 | 2/2009 | |
| WO | 2012/041366 A1 | 4/2012 | |
| WO | 2012082023 | 6/2012 | |
| WO | WO2012082023 * | 6/2012 | H04W 72/04 |
| WO | 2012/127280 A1 | 9/2012 | |
| WO | 2013053339 | 4/2013 | |

OTHER PUBLICATIONS

3GPP TS 36.331 V11.2.0 Technical Specification, 3rd Generation Partnership Project; Technical Specification Group Radio Access Network; Evolved Universal Terrestrial Radio Access (E-UTRA); Radio Resource Control (RRC); Protocol specification (Release 11) (Dec. 2012) (340 pages).

3GPP TS 36.423 V11.3.0 Technical Specification, 3rd Generation Partnership Project; Technical Specification Group Radio Access Network; Evolved Universal Terrestrial Radio Access Network (E-UTRAN); X2 application protocol (X2AP) (Release 11) (Dec. 2012) (141 pages).

3GPP TR 36.912 V11.0.0 Technical Report, 3rd Generation Partnership Project; Technical Specification Group Radio Access Network; Feasibility study for Further Advancements for E-UTRA (LTE-Advanced) (Release 11) (Sep. 2012) (62 pages).

Shuangfeng Han et al., Capacity Analysis of Generalized Distributed Wireless Communication System and Transmit Antenna Selection for Maximization of Average Capacity, Mar. 2009 (6 pages).

Shan-Yuan Ho, Data Fusion in a Relay Network, ISIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kenneth J. Kerpez, IEEE Transactions on Vehicular Technology, vol. 45, No. 2, May 1996, A Radio Access System with Distributed Antennas (11 pages).

David Soldani and Sudhir Dixit, Radio Communications Series, Nokia Siemens Networks Wireless, 2008 (9 pages).

3GPP TSG RAN#57 RP-121418, Chicago, US, Sep. 4-7, 2012, Source: CMCC, Title: New Study Item Proposal: Scenarios and Requirements of LTE Small Cell Enhancements (6 pages).

3GPP TSG-RAN Meeting #58 RP-122032 Barcelona, Spain, Dec. 4-7, 2012 Source: Huawei, HiSilicon, CATR Title: New Study Item Proposal for Small Cell Enhancements for E-UTRA and E-UTRAN—Physical-layer Aspects (10 pages).

3GPP TSG-RAN Meeting#58 RP-122033 Barcelona, Spain, Dec. 4-7, 2012, Source: NTT DOCOMO, Inc. Title: New Study Item Description: Small Cell enhancements for E-UTRA and E-UTRAN—Higher-layer aspects (5 pages).

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

3GPP TSG RAN WG2 #85, R2-140413, Prague, Czech Republic, Agenda Item: 7.2.2, Source: Samsung, Title: On the UE-AMBR in Dual Connectivity, Document for: Discussion, Feb. 10-Feb. 14, 2014 (4 pages).

3GPP TSG-RAN WG3 Meeting #79, R3-130138, St. Julian's, Malta, Agenda Item: 19, Source: NEC, Title: Consideration of the possible structures on the dual connectivity, Document for: Discussion and Decision, Jan. 28-Feb. 1, 2013 (6 pages).

3GPP TSG-RAN WG3 #83, R3-140144, Prague, Czech Republic, Agenda Item: 202, Source: Samsung, Title: Dual Connectivity Impact to S1/X2, Document for: Approval, Feb. 10-14, 2014 (4 pages).

3GPP TSG-RAN WG3 Meeting #83, R3-140347, Prague, Czech Republic, Agenda Item: 20.1, Source: Ericsson, Title: UE-AMBR Allocation in the context of DC scenarios, Document for: Discussions & Approval, Feb. 10-14, 2014 (6 pages).

(56) References Cited

OTHER PUBLICATIONS

European Patent Office, Notification of Transmittal of the International Search Report and the Written Opinion of the International Searching Authority for Int. Appl. No. PCT/US2014/021194 dated Jul. 23, 2014 (19 pages).
Canadian Patent Office, Examination Report for Canadian Appl. No. 2904023 dated Feb. 8, 2017 (6 pages).
European Patent Office, Communication pursuant to Article 94(3) EPC for Application No. 14714479.4 dated May 31, 2017 (5 pages).
European Patent Office, Communication pursuant to Article 94(3) EPC for Appl. No. 14714479.4 dated May 3, 2018 (4 pages).
Canadian Intellectual Property Office, Office Action for Appl. No. 2,904,023 dated Jan. 15, 2018 (6 pages).

* cited by examiner

SENDING DATA RATE INFORMATION TO A WIRELESS ACCESS NETWORK NODE

CROSS REFERENCE TO RELATED APPLICATION

This is a continuation of U.S. application Ser. No. 13/789,931, filed Mar. 8, 2013, which is hereby incorporated by reference in their entirety.

BACKGROUND

As the number of wireless user equipments (UEs) has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then communications with UEs can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
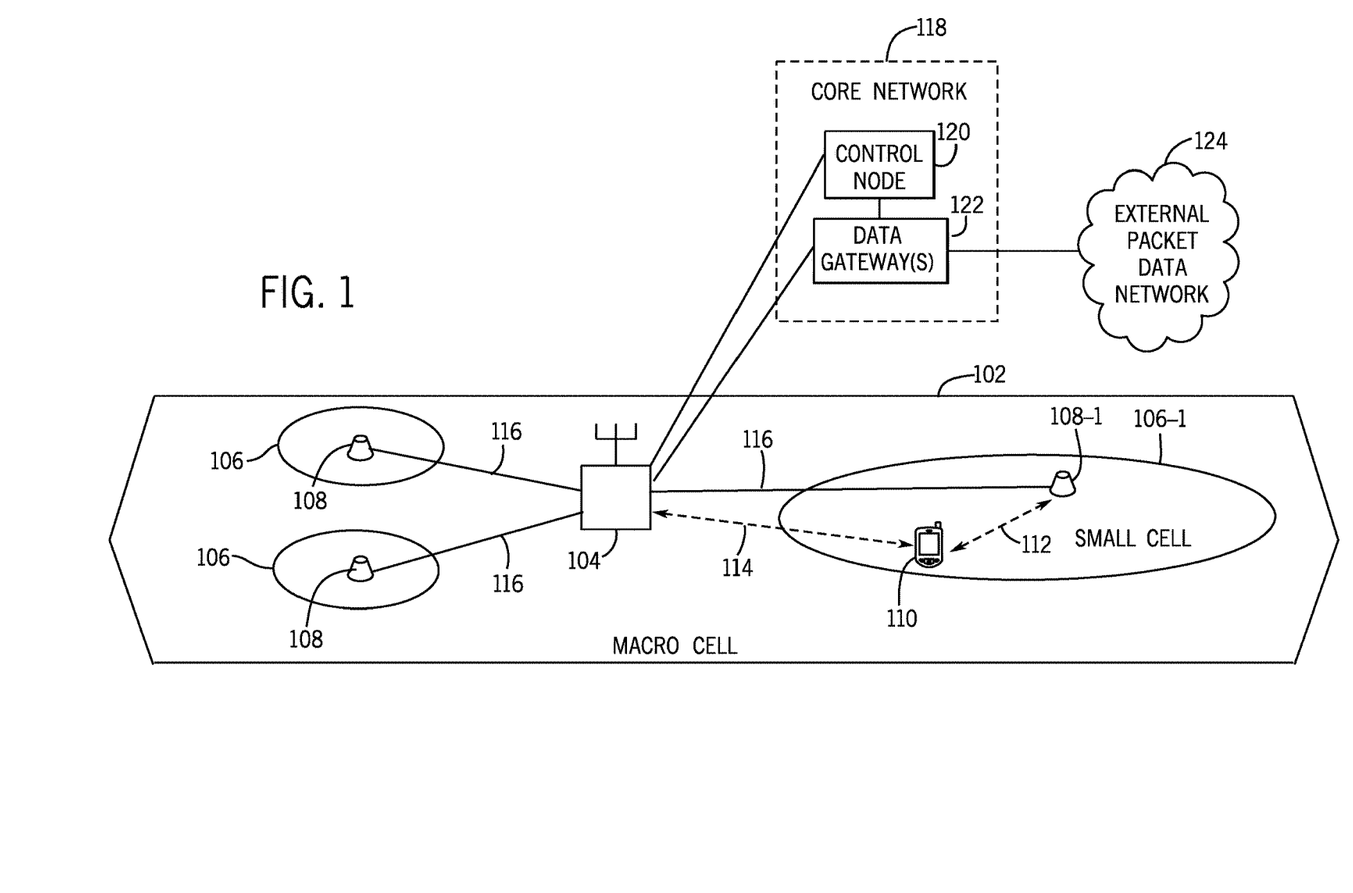
FIG. 1 is a schematic diagram of an example arrangement that includes macro cells and small cells, in accordance with some implementations.

FIG. 1 illustrates an example arrangement that includes network nodes that are part of a mobile communications network that supports wireless communications with user equipments (UEs). A node can refer to an active electronic device that is capable of sending, receiving, and forwarding information over a communication channel, and of performing designated tasks. A macro cell 102 corresponds to a coverage area provided by a macro wireless access network node 104. A coverage area can refer to a region where mobile services can be provided by a network node to a target level. A wireless access network node is responsible for performing wireless transmissions and receptions with UEs. In addition, a number of small cells 106 are depicted as being within the coverage area of the macro cell 102. Each small cell 106 corresponds to a coverage area provided by a respective local wireless access network node 108. One of the small cells is labeled 106-1, and the corresponding local wireless access network node is labeled 108-1.

In the ensuing discussion, a small cell can refer to a cell whose coverage area is smaller than the coverage area provided by a larger cell, which is also referred to as a macro cell. In some examples, the frequency at which the macro wireless access network node 104 operates can be lower than that of a local wireless access network node 108. A lower frequency allows a greater geographic reach for wireless signals transmitted by the macro wireless access network node 104. A higher frequency, on the other hand, of wireless signals transmitted by the local wireless access nodes 108 prevents such wireless signals from propagating great distances. As a result, small cells 106 can be deployed in relatively close proximity to each other.

More generally, the macro cell 102 can use a frequency that is different from one or more frequencies of the small cells 106. At least some of the small cells 106 can use different frequencies.

A wireless user equipment (UE) 110 within the coverage area of the small cell 106-1 is able to wirelessly communicate with the local wireless access network node 108-1. The UE 110 is also able to wirelessly communicate with the macro wireless access network node 104. Examples of the UE 110 can include any of the following: a smart phone, a personal digital assistant, a notebook computer, a tablet computer, or any other device that is capable of wireless communications. Although just one UE 110 is depicted in FIG. 1, it is noted that multiple UEs may be present in coverage areas of each of the small cells 106 as well as within the coverage area of the macro cell 102. Although reference is made to macro and local wireless access network nodes in the present discussion, it is noted that techniques or mechanisms according to some implementations can also be applied to other types of wireless access network nodes.

A first wireless connection 112 is established between the UE 110 and the local wireless access network node 108-1. In addition, a second wireless connection 114 can be established between the UE 110 and the macro wireless access network node 104. In such an arrangement, the UE 110 is considered to have established dual concurrent wireless connections with the macro wireless access network node 104 and the local wireless access network node 108-1.

FIG. 1 also shows a backhaul link 116 between the macro wireless access network node 104 and each of the local wireless access network nodes 108. The backhaul link 116 can represent a logical communication link between two nodes; the backhaul link 116 can either be a direct point-to-point link or can be routed through another communication network or node. In some implementations, the backhaul link 116 is a wired link. In other implementations, the backhaul link 116 is a wireless link.

In some implementations, the macro cell 102 (and more specifically the macro wireless access network node 104) can provide all of the control plane functions, while a small cell 106 (more specifically the corresponding local wireless access network node 108) provides at least a portion of the user plane functions for a dual-connection capable UE (a UE that is capable of concurrently connecting to both macro and small cells). Note that the macro wireless access network node 104 can also provide user plane functions for the dual-connection capable UE.

Control plane functions involve exchanging certain control signaling between the macro wireless access network node 104 and the UE 110 to perform specified control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro wireless access network node 104. In some implementations, the action of adding or removing a small cell for a UE can be transparent to a core network 118 of the mobile communications network. The core network 118 includes a control node 120 and one or more data gateways 122. The data gateway(s) 122 can be coupled to an external packet data network (PDN) 124, such as the Internet, a local area network (LAN), a wide area network (WAN), and so forth.

Note that a legacy UE (a UE that is not capable of establishing dual wireless connections with both a macro cell and a small cell) can connect to either a macro cell or a small cell using standard wireless connection techniques.

An issue associated with a UE that has established dual wireless connections with a macro cell and a small cell is that it can be challenging to maintain quality-of-service (QoS) control and data rate control in wireless communications with the UE. QoS control refers to provision of a specified service level (in terms of bandwidth, data rate, etc.) to a UE. Data rate control refers to controlling a rate of data communication according to a target data rate.

Parameters relating to QoS control and data rate control can be specified for the communication of data with a UE. In some examples, the parameters can include data rate thresholds. Data communicated in a traffic flow or in a group of traffic flows has to conform to the respective data rate threshold (e.g. the data communicated should not exceed the data rate threshold, or the data communicated should satisfy a guaranteed data rate).

It is relatively straightforward to enforce a data rate threshold when traffic data is communicated with a UE that is connected to just one wireless access network node. However, in scenarios where the UE is connected to multiple wireless access network nodes, data rate threshold enforcement can be challenging.

Figure 2:
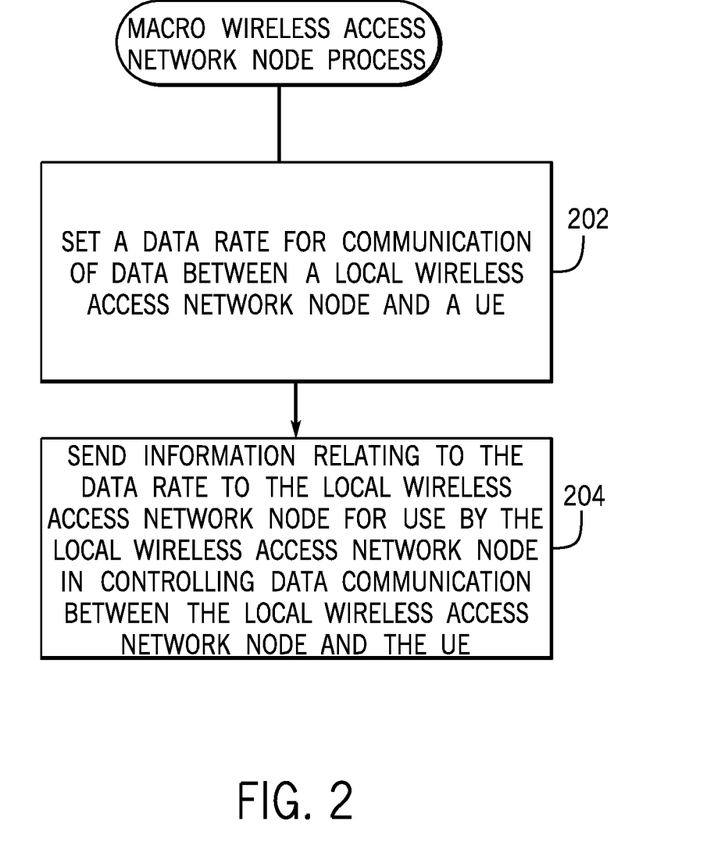
FIG. 2 is a flow diagram of a process of providing data rate information to a local wireless access network node, according to some implementations.

FIG. 2 is a flow diagram of a process that can be performed by the macro wireless access network node 104 to address the foregoing issues. In the process of FIG. 2, it is assumed that the UE 110 has established dual wireless connections with the macro wireless access network node 104 and the local wireless access network node 108-1.

The macro wireless access network node 104 can set (at 202) a data rate for communication of data between a local wireless access network node 108-1 and the UE 110 (which has established dual concurrent wireless connections with the macro wireless access network node 104 and the local wireless access network node 108-1). The macro wireless access network node 104 then sends (at 204) information relating to the data rate to the local wireless access network node for use by the local wireless access network node 108-1 in controlling data communication between the local wireless access network node 108-1 and the UE 110.

In this way, QoS and data rate control can be managed at the macro wireless access network node 104, and coordinated with a local wireless access network node for a UE that has dual wireless connections.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to LTE in the ensuing discussion, it is noted that techniques or mechanisms according to some implementations can be applied to other wireless access technologies.

In an LTE network, a wireless access network node can be implemented as an enhanced Node B (eNB), which includes functionalities of a base station and base station controller. Thus, in an LTE network, a macro wireless access network node is referred to as a macro eNB. In an LTE network, local wireless access network nodes can be referred to as local eNBs (LeNBs).

In an LTE network, the control node 120 in the core network 118 can be implemented as a mobility management entity (MME). An MME is a control node for performing various control tasks associated with an LTE network. For example, the MME can perform idle mode UE tracking and paging, bearer activation and deactivation, selection of a serving gateway (discussed further below) when the UE initially attaches to the LTE network, handover of the UE between macro eNBs, authentication of a user, generation and allocation of a temporary identity to a UE, and so forth. In other examples, the MME can perform other or alternative tasks.

In an LTE network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the LTE network and a network element coupled to the PDN 124. Note that there can be multiple PDNs and corresponding PDN-GWs. Moreover, there can be multiple MMES and SGWs.

According to LTE, various parameters can be defined for QoS control and data rate control. Parameters can be defined at the level of a bearer. According to LTE, an Enhanced Packet Services (EPS) bearer provides the level of granularity for bearer-level QoS control in the core network and the wireless access network. An EPS bearer is established between the UE and the PDN-GW. Another bearer is an E-UTRAN (Evolved Universal Terrestrial Radio Access Network) Radio Access Bearer (E-RAB), which transports packets of an EPS bearer between the UE and the SGW of the core network 118. A data radio bearer (DRB) transports the packets of an EPS bearer between a UE and an eNB.

There can be a one-to-one mapping between an E-RAB and an EPS bearer, and there can be a one-to-one mapping between a DRB and the EPS bearer or the E-RAB.

More generally, a bearer can refer to any logical structure defined in a mobile communications network for carrying a flow of traffic.

Bearer-level QoS parameters (which can be associated with an EPS bearer or E-RAB, for example) can include some or all of the following: QoS Class Identifier (QCI), Allocation and Retention Priority (ARP), Guaranteed Bit Rate (GBR), and Maximum Bit Rate (MBR). Data rate parameters can include Aggregate Maximum Bit Rate (AMBR) parameters, discussed further below. GBR, MBR, and AMBR are examples of data rate thresholds that can be associated with a bearer or group of bearers.

An EPS bearer or E-RAB is referred to as a GBR bearer if the bearer is associated with a guaranteed data rate, in the form of a GBR, for example. Otherwise, an EPS bearer or E-RAB is referred to as a non-GBR bearer.

A QCI is a value that can be used as a reference to access certain parameters that control bearer-level packet treatment, such as scheduling, admission control, queue management, and so forth.

An ARP indicates the priority of the respective bearer. The ARP can be used in deciding which bearers to drop when congestion is detected.

The GBR is the bit rate that can be expected to be provided by a GBR bearer. An MBR is the maximum bit rate that can be expected to be provided by a GBR bearer. The MBR can be greater than or equal to the GBR. Note that GBR and MBR denote bit rates of traffic communication per bearer. In other words, in a given bearer, traffic data communication is enforced according to the GBR and/or MBR. GBR and MBR are applicable to a GBR bearer.

There are two types of AMBR parameters: per-UE AMBR (UE-AMBR), and per-APN AMBR (APN-AMBR). "APN" stands for "access point name" and identifies a PDN (e.g. 124 in FIG. 1) to which a UE can be connected for communicating data. A UE can be connected to multiple PDNs that are identified by respective APNs. In such a case, multiple PDN-GWs in the core network 118 can serve the UE, where each PDN-GW provides for the connection between the UE and the respective PDN.

A UE-AMBR and APN-AMBR denote bit rates of traffic communication per group of bearers. If a UE is communicating data in a group of bearers, then the overall bit rate (e.g. sum or other aggregate of the bit rates of the bearers in the group) should not exceed UE-AMBR. The UE-AMBR for a UE is enforced by an eNB. It is noted that the UE-AMBR is applied to non-GBR bearers.

An APN-AMBR is enforced in the core network 118, and more specifically, by the PDN-GW in the core network 118. A specific PDN (identified by an APN) can communicate data in a group of bearers. The overall bit rate of traffic communication over the group of bearers of the PDN should not exceed the APN-AMBR.

It is noted that each of the bit rate parameters noted above (GBR, MBR, UE-AMBR, APN-AMBR) can be enforced in the uplink direction and in the downlink direction (where the uplink direction refers to a direction of traffic communicated from the UE, and the downlink direction refers to a direction of traffic communicated to the UE). Thus, there is an uplink GBR, downlink GBR, uplink MBR, downlink MBR, uplink UE-AMBR, downlink UE-AMBR, uplink APN-AMBR, and downlink APN-AMBR.

In this discussion, it is assumed that traffic data of a small cell flows through the macro eNB 104. In other words, the LeNB for the small cell is attached to the macro eNB for uplink and downlink traffic data communication. Consequently, only the macro eNB 104 (and not any LeNB) is visible to the core network 118. AMBR control (more specifically APN-AMBR control) by a PDN-GW can be managed without change from existing protocols. In some implementations, managing UE-AMBR can be performed by modifying macro eNBs and LeNBs, without modifying any node in the core network 118.

It is noted that the foregoing does not prevent an LeNB from functioning as an independent eNB for a legacy UE that can only maintain a single wireless connection. In the role of supporting a legacy UE, the LeNB functions as a normal eNB.

Proportional Data Rates for Non-GBR Bearers of a UE

If the traffic associated with non-GBR bearers of a particular UE are split across a macro cell and a small cell (in other words, some of the non-GBR bearers of the particular UE are handled by the macro cell and the remainder of the non-GBR bearers are handled by the small cell), then the corresponding UE-AMBR would have to be also split into a first UE-AMBR portion for traffic flow between the macro cell and the UE, and a second UE-AMBR portion for the traffic flow between the small cell and the UE. The macro eNB 104 can decide the portion of the UE-AMBR should be carved out and assigned to the LeNB (of the small cell).

In some implementations, the macro eNB 104 can divide the UE-AMBR proportionally between the macro eNB 104 and the LeNB (to which a UE has established dual wireless connections). The division of the UE-AMBR can be based on one or more of the following criteria:

(1) The APN-AMBRs of the APNs served by the macro eNB and the LeNB, respectively, if all non-GBR bearers of an APN are served by a single one of the macro eNB or LeNB.

(2) The loading conditions of the macro eNB and LeNB, respectively.

(3) The traffic statistics of the data radio bearers (DRBs) served by the macro eNB and the LeNB, respectively.

The following explains criterion (1). Assume that a given UE is involved in traffic data communications with three PDNs, identified by APN1, APN2, and APN3, respectively. Each of APN1, APN2, and APN3 is associated with a respective APN-AMBR: APN-AMBR1, APN-AMBR2, APN-AMBR3, respectively. It is assumed that all non-GBR bearers of APN1 are served by the macro eNB, while all non-GBR bearers of APN2 and APN3 are served by the LeNB. Non-GBR bearers of an APN being served by a particular eNB refers to the non-GBR bearers of the APN being communicated through the particular eNB.

Generally, the UE-AMBR (either an uplink or downlink UE-AMBR) for traffic communications between an eNB and a UE is equal to a sum of the APN-AMBRs of the respective APNs served by the eNB, up to a cap indicated by a subscribed UE-AMBR. The subscribed UE-AMBR is a specified cap on the UE-AMBR that can be allocated to traffic communication between an eNB and a UE. If the sum of the APN-AMBRs of the respective APNs served by the eNB exceeds the subscribed UE-AMBR, then the UE-AMBR set for the traffic communication between the eNB and the UE is capped by the subscribed UE-AMBR. The subscribed UE-AMBR can be stored in subscriber information for the UE, such as in a home subscriber server (HSS), for example.

When the UE is connected to two eNBs (macro eNB and LeNB), then the UE-AMBR allocated to each eNB is equal to the sum of the APN-AMBR(s) of the APN(s) served by that eNB, up to a proportional share of the subscribed UE-AMBR.

More specifically, in the context of the example discussed further above, a first UE-AMBR portion allocated to the macro eNB 104 can be equal APN-AMBR1, up to a first proportional share of the subscribed UE-AMBR. Similarly, a second UE-AMBR portion allocated to the LeNB can be equal to (APN-AMBR2+APN-AMBR3), up to a second proportional share of the subscribed UE-AMBR.

In the foregoing example, the proportional shares of the subscribed UE-AMBR associated with the macro eNB and LeNB can be calculated based on the relative values of the APN-AMBRs served by the macro eNB and the LeNB. For example, the proportional shares of the subscribed UE-AMBR associated with the macro eNB and the LeNB can be computed based on a ratio between APN-AMBR1 and (APN-AMBR2+APN-AMBR3).

For example, the first proportional share of the subscribed UE-AMBR associated with the macro eNB can be computed as:

Subscribed UE-AMBR*{APN-AMBR1/TOTAL-APN-AMBR}, where

TOTAL-APN-AMBR=APN-AMBR1+APN-AMBR2+APN-AMBR3.

For example, the second proportional share of the subscribed UE-AMBR associated with the LeNB can be computed as:

Subscribed UE-AMBR*{(APN-AMBR2+APN-AMBR3)/TOTAL-APN-AMBR}.

The following explains criterion (2). The loading condition of an eNB (macro eNB or LeNB) refers to how much work the eNB is handling. A metric (or metrics) can be specified to represent this work. For example, the metric represents a percentage of data communication traffic handled by a respective eNB. As another example, the metric represents the radio resource usage on a respective eNB. The proportional division of UE-AMBR between the macro eNB and the LeNB can be based on a pro-rata allocation based on the relative loads at the macro eNB and the LeNB, in some examples. For example, if the LeNB carries 80% of the data communication load and the macro eNB carries 20% of the data communication load, then the LeNB UE-AMBR is set equal to 0.8*UE-AMBR, while the macro eNB UE-AMBR is set equal to 0.2*UE-AMBR. As another example, if the LeNB has X1 physical resource blocks (PRBs) available for carrier traffic and the macro eNB has X2 PRBs available for carrier traffic, then the macro eNB UE-AMBR can be set equal to {X1/(X1+X2)}*UE-AMBR, while the LeNB UE-AMBR can be set equal to {X2/(X1+X2)}*UE-AMBR.

The following explains criterion (3). Traffic statistics of the DRBs served by an eNB can indicate a pattern of traffic data communicated by the eNB. Examples of statistics include average packet delay, packet dropping rate, or average number of packets in the buffer at a respective eNB. The proportional division of UE-AMBR between the macro eNB and the LeNB can be based on the ratio between statistics at the macro eNB and statistics at the LeNB. For example, if the average packet delay at the macro eNB is Y1 seconds and the average packet delay at the LeNB is Y2 seconds, then the macro eNB UE-AMBR can be set equal to {Y2/(Y1+Y2)}* UE-AMBR while the LeNB UE-AMBR can be set equal to {Y1/(Y1+Y2)}*UE-AMBR.

Figure 3:
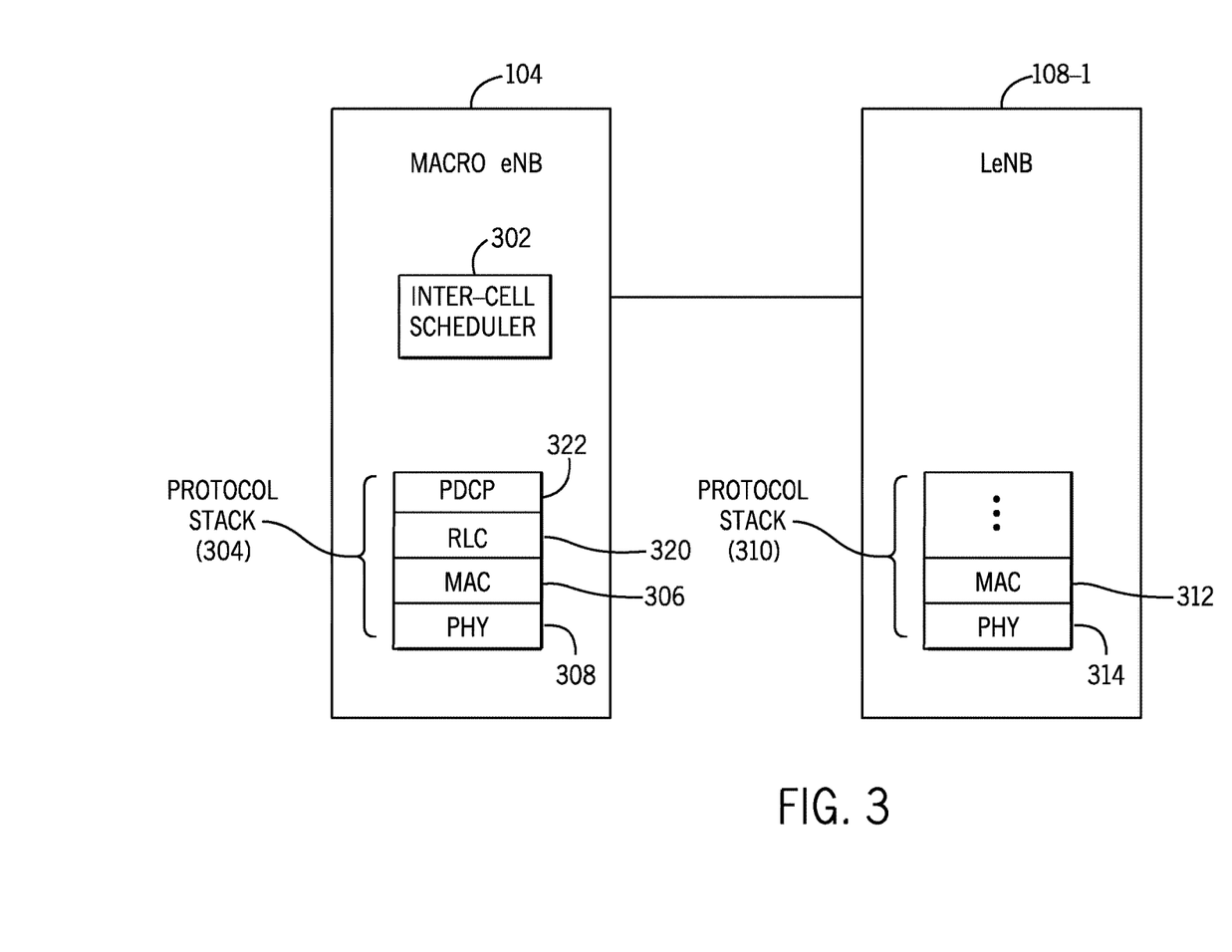
FIG. 3 is a block diagram of a macro wireless access network node and a local wireless access network node, according to some implementations.

FIG. 3 illustrates example components in the macro eNB 104 and the LeNB 108-1. The macro eNB 104 can include an inter-cell scheduler 302, which is responsible for radio access bearer setup for both the macro eNB 104 and LeNBs (including 108-1) in the coverage area of the macro eNB 104.

The macro eNB 104 also includes a protocol stack 304, which includes layers that provide specified procedures for performing communications. In FIG. 3, a medium access control (MAC) layer 306 and physical layer 308 of the protocol stack 304 are depicted. The physical layer 308 can include networking hardware for transmitting signals over a wireless link. The MAC layer 306 provides addressing and channel access control mechanisms.

The LeNB 108-1 also includes a protocol stack 310, which includes a MAC layer 312 and a physical layer 314. The protocol stack 310 of the LeNB 108-1 is used in communications between the LeNB 108-1 and a UE (such as 110 in FIG. 1), while the protocol stack 304 of the macro eNB 104 is used in communications between the macro eNB 104 and the UE.

For downlink traffic data (to be sent to the UE), the inter-cell scheduler 302 in the macro eNB 104 can determine the downlink UE-AMBR values to be used by the macro eNB 104 and the LeNB 108-1, respectively. For example, the inter-cell scheduler 302 can set UE-AMBR_DL_LeNB as the UE-AMBR value to use for downlink communication from the LeNB 108-1 to the UE, and UE-AMBR_DL_Macro as the UE-AMBR value to use for downlink communication from the macro eNB 104 to the UE.

Since the macro eNB 104 controls radio access bearer setup of the radio access bearers that are served by the LeNB 108-1, the macro eNB 104 does not have to send UE-AMBR_DL_LeNB to the LeNB 108-1. Instead, downlink data rate control of downlink data sent to the UE by the LeNB 108-1 can be controlled internally by the macro-eNB 104.

For uplink traffic data, however, note that uplink data scheduling is separately controlled by the MAC layers 306 and 312 in the macro eNB 104 and the LeNB 108-1, respectively, for respective separate uplink data sent by the UE to the macro eNB 104 and the LeNB 108-1. The uplink scheduling performed by respective MAC schedulers in the MAC layers 306 and 312 are based on respective uplink UE-AMBR values apportioned between the macro eNB 104 and the LeNB 108-1. The uplink UE-AMBR value for the macro eNB 104 can be represented as UE-AMBR_UL_Macro, while the uplink UE-AMBR value for the LeNB 108-1 can be represented as UE-AMBR_UL_LeNB.

The UE-AMBR_UL_LeNB value is set by the macro eNB 104, but is communicated to the LeNB 108-1 for use by the MAC scheduler in the MAC layer 312 of the LeNB 108-1 in making scheduling decisions for uplink data. In some examples, the macro eNB 104 sends the UE-AMBR_UL_LeNB value to LeNB 108-1 as of UE Context information or other type of information, which can be part of a handover message or data offload message. The handover message can be used to perform handover of the UE to the LeNB 108-1 (while maintaining the control plane functionalities at the macro eNB 104). The offload message can be used to indicate that at least a portion of data communication is to be offloaded from the macro eNB 104 to the LeNB 108-1.

In a specific example, the UE-AMBR_UL_LeNB value can be included in the following information element that is part of the UE Context information:

UE Aggregate Maximum Bit Rate Uplink.

The MAC scheduler in the LeNB 108-1 uses the UE-AMBR_UL_LeNB value in uplink scheduling to cap the uplink data transmission rate. Similarly, the MAC scheduler in the macro eNB 104 uses the UE-AMBR_UL_Macro value in uplink scheduling to cap the uplink data transmission rate.

If UE-AMBR_UL represents the total UE-AMBR to use for uplink data communication for a UE, then the values determined for UE-AMBR_UL_LeNB and UE-AMBR_UL_Macro satisfy the following:

UE-AMBR_UL≥UE-AMBR_UL_LeNB+UE-AMBR_UL_Macro.

If the non-GBR bearers of the same APN are served by the same eNB (macro eNB 104 or LeNB 108-1), then the macro eNB 104 can determine the uplink UE-AMBR values for the macro cell and small cell as follows:

UE-AMBR_UL_LeNB is set to the sum of the APN-AMBR(s) of active APN(s) served by the LeNB 108-1, up to the respective proportional share of the subscribed UE-AMBR associated with the LeNB 108-1.

UE-AMBR_UL_Macro is set to the sum of the APN-AMBR(s) of active APN(s) served by the macro eNB 104, up to the respective proportional share of the subscribed UE-AMBR associated with the macro eNB 104.

In some implementations, further adjustment can be made to the UE-AMBR_UL_LeNB and UE-AMBR_UL_Macro values, depending on where a user plane split occurs in the protocol stacks 304 and 314 of the macro eNB 104 and LeNB 108-1.

The protocol stacks 304 and 314 depicted in FIG. 3 are user plane protocol stacks. In addition to the MAC and physical layers shown in FIG. 3, there can be other protocol layers, including a Packet Data Convergence Protocol (PDCP) layer and a radio link control (RLC) layer. As shown in FIG. 3, the protocol stack 304 in the macro eNB 104 includes an RLC layer 320 and a PDCP layer 322. The PDCP layer 322 is above the RLC layer 320, which is above the MAC layer 306. The protocol stack 310 of the LeNB 108-1 may or may not include the PDCP and RLC layers, depending on where the user plane split occurs.

The PDCP layer can provide at least some of the following functionalities in the user plane, as described in 3GPP TS 36.323, including: header compression and decompression; in-sequence delivery of upper layer packet data units (PDUs), duplicate detection of lower layer service data units (SDUs), retransmission of PDCP SDUs; and so forth.

The RLC layer can provide at least some of the following example functionalities, as described in 3GPP TS 36.322, including: transfer of upper layer PDUs, error correction, such as by using Automatic Repeat reQuest (ARQ); concatenation, segmentation, and reassembly of RLC SDUs; reordering of RLC data PDUs, and so forth.

Which protocol layers are included in the LeNB 108-1 depends on where a user plane protocol stack is split in the macro eNB 104. Splitting a user plane protocol stack at a given point results in multiple user plane paths, with one user plane path through the macro eNB and another user plane path through the LeNB. The splitting can be performed at one of several different points in the user plane protocol stack.

If a split occurs right below the PDCP layer 322, then that means that the PDCP layer is provided in the macro eNB 104 but not in the LeNB 108-1. As a result, the data to be communicated between the macro eNB 104 and the LeNB 108-1 would be a PDCP PDU, which includes a PDCP header. The PDCP header adds to the size of information communicated. Note that UE-AMBR is specified for the actual traffic data. To account for presence of the PDCP header, the AMBR_UL_LeNB and UE-AMBR_UL_Macro values can be adjusted by increasing them to account for the PDCP header. For example, if the PDCP header has been determined (based on statistical analysis for example) to add 5% to the size of the overall information communicated, then the AMBR_UL_LeNB and UE-AMBR_UL_Macro values can each be increased by 5%.

Similarly, if a split occurs right below the RLC layer 320, then that means the packets exchanged between the macro eNB 104 and LeNB 108-1 include both PDCP and RLC headers. Adjustments of the AMBR_UL_LeNB and UE-AMBR_UL_Macro values can be made to account for the total size of the PDCP and RLC headers.

More generally, the adjustment of the UE-AMBR values can be an increase of the UE-AMBR values based on the overall header size added by a protocol layer header (e.g. the PDCP header or the PDCP and RLC headers).

In the foregoing discussion, it is assumed that the uplink UE-AMBR portion is sent to the LeNB 108-1, but not the downlink UE-AMBR portion. Alternatively, if the scheduler in the LeNB 108-1 uses the downlink UE-AMBR information to perform congestion control, such as to decide which UEs to drop, then the downlink UE-AMBR information can also be sent by the macro eNB 104 to the LeNB 108-1.

For example, both the UE-AMBR_DL_LeNB and UE-AMBR_UL_LeNB values discussed above can be sent in the following information elements in the UE Context information:

UE Aggregate Maximum Bit Rate Downlink;
UE Aggregate Maximum Bit Rate Uplink.

In alternative implementations, instead of sending the UE-AMBR (e.g. the UE-AMBR_UL_LeNB value) for each UE to the LeNB 108-1 by default, which can consume network communication bandwidth if there is a large number of UEs, one of the following two options can be used. When the data rate of a given UE exceeds its UE-AMBR, the macro eNB 104 may ask the small cell to slow down by either sending a new UE-AMBR, or simply sending an indication about the fact that the UE-AMBR has been exceeded. The LeNB 108-1 can then reduce the data rate accordingly for the given UE.

Data Rates for Bundled Non-GBR Bearers

Non-GBR bearers can be either dedicated non-GBR bearers or default non-GBR bearers. A default non-GBR bearer is a GBR bearer that is established when the UE connects to a PDN. The default non-GBR bearer remains established throughout the lifetime of the PDN connection to provide the UE with always-on Internet Protocol (IP) connectivity to the PDN.

Default bearers are created on a per-PDN basis. Thus, if the UE is connected to multiple PDNs, then there can be multiple default non-GBR bearers.

Once a default non-GBR bearer is established for a given PDN, any additional non-GBR bearer that is established for the same PDN is referred to as a dedicated non-GBR bearer.

In some implementations, all dedicated non-GBR bearers of a UE are handled by a single eNB (either the macro eNB 104 or the LeNB 108-1). In this manner, the dedicated non-GBR bearers are considered to be bundled for handling by one or the other of the macro eNB and LeNB. In such scenario, when traffic data of a UE is offloaded to a small cell (which means all the dedicated non-GBR bearers are offloaded to the small cell), then a first fraction of the UE-AMBR would be allocated to the small cell for communicating the dedicated non-GBR bearers, while a second fraction of the UE-AMBR is allocated to the macro eNB for communicating the default non-GBR bearer(s).

The UE-AMBR allocated for the handling of the bundle of dedicated non-GBR bearers is represented as UE-AMBR_Dedicated. A benefit of bundling all dedicated non-GBR bearers and assigning the handling of the bundle to either the macro eNB 104 or LeNB 108-1, is that each dedicated non-GBR bearer in the bundle can potentially utilize a transmission bit rate up to the entire UE-AMBR_Dedicated value (such as in the situation when the other dedicated non-GBR bearers are not carrying any traffic or are carrying a relatively small amount of traffic).

UE-AMBR_Dedicated_DL represents the downlink UE-AMBR_Dedicated, while UE-AMBR_Dedicated_UL represents the uplink UE-AMBR_Dedicated. The parameters UE-AMBR_Dedicated_DL and UE-AMBR_Dedicated_UL are derived as follows:

$$UE\text{-}AMBR\_Dedicated\_DL = UE\text{-}AMBR\_DL - n*UE\text{-}BR\_Default\_DL,$$

$$UE\text{-}AMBR\_Dedicated\_UL = UE\text{-}AMBR\_UL - n*UE\text{-}BR\_Default\_UL,$$

where $n$ ($n \geq 1$) is the number of default bearers that the UE has, and UE-BR_Default_DL and UE-BR_Default_UL are the bit rates for one default bearer on the downlink and one default bearer on the uplink, respectively. Since the number of PDN-GWs the UE connects to may change, the values of UE-AMBR_Dedicated_DL and UE-AMBR_Dedicated_UL may change accordingly. Thus whenever the UE adds or removes a PDN connection, the macro eNB 104 re-computes the UE-AMBR_Dedicated_DL and UE-AMBR_Dedicated_UL values and sends them to the LeNB 108-1.

If the non-GBR bearers are all handled by the macro eNB 104, then the small cell can assist with the traffic of GBR bearer only. In this case, the macro eNB 104 does not have to transfer the UE-AMBR information element to the LeNB 108-1 as part of the UE Context Information. Instead, the macro eNB 104 can send the EPS Bearer QoS parameters (e.g. QCI, ARP, GBR and MBR) to the LeNB 108-1 for the EPS bearer that is to be managed by the small cell.

Data Rate for GBR Bearer

In addition to offloading non-GBR bearers as discussed above, the macro eNB can also offload GBR bearers to an affiliated small cell. The QoS information for the GBR bearers are provided to the LeNB's MAC scheduler, regardless of which protocol layer the small cell splits from the macro cell.

For downlink data, since the small cell is connected to the macro cell for traffic data (in other words, downlink traffic data to the UE is sent from the macro cell to the small cell, and then to the UE), the inter-cell scheduler 302 at the macro eNB 104 can enforce the downlink data rate, including the GBR and MBR for the GBR bearer. As a result, the macro eNB 104 does not have to send downlink GBR and MBR information to the LeNB 108-1 for GBR bearers.

Alternatively, the scheduler in the LeNB 108-1 may use the downlink GBR and MBR information for congestion control or other purposes. In this case, the downlink data rate information, including GBR and MBR, for GBR bearers can be passed from the macro eNB 104 to the LeNB 108-1.

For uplink data, the MAC scheduler for enforcing uplink data rates resides in the LeNB 108-1, and thus is provided with the uplink data rate information (uplink GBR and MBR) for GBR bearers. Example information elements for communicating the uplink GBR and MBR are provided below:

E-RAB Guaranteed Bit Rate Uplink Adjusted;
E-RAB Maximum Bit Rate Uplink Adjusted.

The E-RAB Guaranteed Bit Rate Uplink Adjusted information element contains an adjusted GBR for the GBR bearer, and the E-RAB Maximum Bit Rate Uplink Adjusted information element contains an adjusted MBR for a GBR bearer. The adjustment of the GBR and MBR may be performed in the case where the user plane split occurs right below the PDCP layer or the RLC layer, as discussed above.

The adjustment can be an increase of the GBR and MBR values to based on the overall header size added by a protocol layer header (e.g. the PDCP header or the PDCP and RLC headers).

Splitting GBR and Non-GBR Bearers between Macro eNB and LeNB

In some implementations, the inter-cell scheduler 302 in the macro eNB 104 can determine the types of bearers to be handled by each network node (macro eNB 104 or LeNB 108-1). An example relating to an application for voice-over-IP communications is provided below. Note that the following describes a specific example for purposes of illustration. In other examples, other combinations of bearers can be handled.

To support voice-over-IP communications, the UE supports the following combination of radio bearers:

SRB1+SRB2+4×AM DRB+1×UM DRB, where "AM" refers to "acknowledged mode," and "UM" refers to "unacknowledged mode. In the foregoing, "4×AM DRB" indicates that four AM DRBs are supported by the UE, and "1×UM DRB" indicates that one UM DRB is supported by the UE.

To support voice-over-IP communications, a network node (e.g. macro eNB or LeNB) supports the following combination of radio bearers:

SRB1+SRB2+2×AM DRB+1×UM DRB.

Of the two AM DRBs supported by the network node, one AM DRB is utilized for an EPS bearer with QCI=5, and another AM DRB is utilized for an EPS bearer with QCI=8 or 9. An UM DRB is utilized for an EPS bearer with QCI=1.

In some examples, bearers associated with a QCI between 1 and 4 are implemented as GBR bearers, and bearers associated with a QCI between 5 and 9 are implemented as non-GBR bearers.

The RLC layer in a network node is configured to perform data transfer in the following modes, as specified in 3GPP TS 36.322, for example:

UM for an EPS bearer with QCI=1 (GBR bearer);
AM for an EPS bearer with QCI=5 (non-GBR bearer);
AM for an EPS bearer with QCI=8 or 9 (non-GBR bearer)

In some examples where bundling is employed (as discussed in the "Data Rates for Bundled Non-GBR Bearers" section above), to support voice-over-IP communications using both a macro cell and small cell, all of the non-GBR bearers (except the default bearer) can be handled by one network node, while a GBR bearer can be handled by either. Several examples are provided below:

(a) The UM DRB with QCI=1 (GBR bearer), the AM DRB with QCI=8 or 9 (non-GBR bearer), and the AM DRB with QCI=5 (non-GBR bearer for IP Multimedia System (IMS) signaling, for example) are all carried by the small cell for a UE. This is appropriate for a relatively low mobility UE where frequent handover is unlikely, and the backhaul link between macro cell and small cell has relatively low latency.

(b) The UM DRB with QCI=1 (GBR bearer) and the AM DRB with QCI=8 or 9 (non-GBR bearer) are carried by the small cell for a UE. The AM DRB with QCI=5 (non-GBR bearer for signaling) is carried by the macro eNB 104. Since signaling (e.g. IMS signaling) can be relatively infrequent compared to the traffic data payload, and relatively high reliability and low latency should be provided to signaling, the signaling can be communicated directly with macro eNB 104, without passing through the LeNB 108-1.

(c) The AM DRB with QCI=8/9 is carried by the small cell for a UE. The UM DRB with QCI=1 (GBR) for Conversational Voice, AM DRB with QCI=5 (non-GBR bearer) for IMS signaling) are carried by the macro-eNB. Since Conversational Voice is delay-sensitive, it is appropriate to carry it directly from macro-eNB if the backhaul delay between macro-cell and small cell is relatively long.

For each of the example combinations above, in accordance with some implementations, the default non-GBR bearers are carried by the macro eNB 104 for always-on connectivity of the UE to respective PDNs.

In some implementations where bundling is employed, all dedicated non-GBR bearers can be carried by a small cell, rather than the macro cell. This can be effectively used if the backhaul link (e.g. 116 in FIG. 1) between the macro eNB 104 and the LeNB 108-1 has a relatively low latency.

In addition, according further implementations, all bearers (GBR or non-GBR) with relatively low latency specifications (e.g., delay budget is 100 milliseconds or less) are carried by the macro cell. In addition, all bearers (GBR or non-GBR) with relaxed latency specifications (e.g., delay budget is above 100 milliseconds) are carried by a small cell. Such implementations can be used if the backhaul link has a relatively high latency.

As can be seen above examples, the assignment of GBR and non-GBR bearers between the macro cell and the small cell depends on several factors, including the requested QCI, backhaul link characteristics, and UE mobility.

Rate Control at the Core Network Control Node

The foregoing describes examples where the LeNB 108-1 is connected to the macro eNB 104, and thus the LeNB 108-1 is transparent to the core network 118. In other words, the LeNB 108-1 does not have control plane and user plane paths (e.g. S1-MME and S1-U links) to the core network 118. In other examples, the LeNB 108-1 can be connected to the core network 118. For example, the LeNB 108-1 can have a direct S1-MME link to the MME, and a direct S1-U link to the SGW. In this case, an EPS bearer can be carried directly between the SGW and the LeNB 108-1, without traversing the macro eNB 104.

In such arrangements, the macro eNB 104 is not capable of enforcing UE-AMBR rate control for both the macro eNB 104 and the LeNB 108-1. As a result, UE-AMBR rate control would have to be managed by the MME (e.g. 120 in FIG. 1). For example, the MME 120 can derive two eNB-level UE-AMBR values: UE-AMBR-Macro for the macro eNB 104, and a UE-AMBR-LeNB for the LeNB 108-1. From the overall UE-AMBR value, the UE-AMBR-Macro and a UE-AMBR-LeNB values can be derived from the APN-AMBRs that each eNB carries, without exceeding the overall UE-AMBR.

The MME 120 sends the UE-AMBR-Macro and UE-AMBR-LeNB values to the macro eNB 104 and the LeNB 108-1, respectively, over the respective S1-MME links. The macro eNB 104 controls traffic data communications (uplink and downlink) according to the UE-AMBR-Macro value over all non-GBR bearers that flows through the macro eNB 104. Similarly, the LeNB 108-1 controls traffic data communications (uplink and downlink) according to the UE-AMBR-LeNB value over all non-GBR bearers that flows through the LeNB 108-1.

More generally, a core network control node, such as the MME 120, is able to determine separate data rates for respective macro and small cells to which a UE has dual wireless connections. These separate data rates are communicated by the control node to the respective wireless access network nodes of the macro and small cells.

Control of Logical Channels

The configuration of DRBs are handled by the macro eNB 104 using dedicated RRC signaling. Note that the macro eNB 104 has to handle configuration of DRBs that are carried by the macro eNB 104 and of DRBs that are carried by the LeNB 108-1.

In some examples, DRB configuration information is contained in a RadioResourceConfigDedicated information element, as specified by 3GPP TS 36.331. The RadioResourceConfigDedicated information element carried in RRC signaling can be used to set up, modify, or release radio bearers, to modify a main configuration of a MAC layer, to modify an semi-persistent scheduling (SPS) configuration, and to modify a dedicated physical channel configuration.

In accordance with some implementations, in addition to DRB information for DRBs carried by the macro eNB 104, the RadioResourceConfigDedicated information element is modified to also include information regarding DRBs of a small cell. The RRC signaling sent by the macro eNB 104 to the UE, and which carries the RadioResourceConfigDedicated information element, thus provides information to the UE regarding which DRBs are carried by which of the macro eNB 104 and LeNB 108-1.

In some implementations, the logicalChannelConfig information element carried in RRC signaling identifies logical channels established between the eNB and UE. In the case where the UE is connected to both the macro eNB 104 and the LeNB 108-1, two logicalChannelConfig information elements can be provided for the macro eNB 104 and LeNB 108-1 separately. By reading the two logicalChannelConfig information elements, an uplink scheduler in the UE knows to which uplink (uplink to macro cell or uplink to small cell) to send uplink data of a given logical channel. The UE can also manage the two uplinks separately in terms of parameters of the logical channels, including the priority beween logical channels and the prioritized bit rates (PBRs) of the uplink logical channels (as represented in a PrioritizedBitRate parameter). Thus UE does not mix the two uplinks into the one uplink scheduling procedure.

The priorities and PBRs of the uplink logical channels are used by the scheduler in the UE to perform scheduling of the logical channels. The UE scheduler can determine which uplink channels are to be prioritized over other uplink channels during scheduling. In some implementations, the PBR that the RRC signaling passes to the UE takes into account the UE-AMBR portion that the macro eNB 104 has transferred to the small cell.

In terms of defining logicalChannelConfig information element, the inter-cell scheduler 302 in the macro eNB 104 labels the uplink logical channels such that the indexing on the macro cell side is distinct from the indexing on the small cell side. For example, the logical channels on the macro cell side can have logicalChannelIdentity (identity of a logical channel) in a first range of {3, 4}, while the logical channels on the small cell side can have logicalChannelIdentity in a second, different range.

As specific examples, the RadioResourceConfigDedicated information element specified in 3GPP TS 36.331 can be modified to add the following elements to support small cells.

```
drb-ToAddModList-LeNB DRB-ToAddModList-LeNB      OPTIONAL,      -- Cond HO-
toEUTRA;
drb-ToReleaseList-LeNBDRB-ToReleaseList-LeNB     OPTIONAL,      -- Need ON.
mac-MainConfig-LeNB            CHOICE {
    explicitValue              MAC-MainConfig,
    defaultValue               NULL
  } OPTIONAL,                                                   -- Cond HO-
toEUTRA2
physicalConfigDedicated-LeNB        PhysicalConfigDedicated
  OPTIONAL,  -- Need ON
RadioResourceConfigDedicatedSCell-r10 ::= SEQUENCE {
  -- UE specific configuration extensions applicable for an SCell
    physicalConfigDedicatedSCell-r10      PhysicalConfigDedicatedSCell-r10
OPTIONAL, -- Need ON
DRB-ToAddModList-LeNB ::=       SEQUENCE (SIZE (1..maxDRB)) OF DRB-
ToAddMod-LeNB
DRB-ToAddMod-LeNB ::= SEQUENCE {
    eps-BearerIdentity         INTEGER (0..15)       OPTIONAL, --
Cond DRB-Setup
    drb-Identity               DRB-Identity,
    pdcp-Config                PDCP-Config           OPTIONAL, --
Cond PDCP
    rlc-Config                 RLC-Config            OPTIONAL, --
Cond Setup
    logicalChannelIdentity     INTEGER (3..10)       OPTIONAL, --
Cond DRB-Setup
    logicalChannelConfig       LogicalChannelConfig  OPTIONAL, --
Cond Setup
    ...
}
DRB-ToReleaseList-LeNB ::=      SEQUENCE (SIZE (1..maxDRB)) OF DRB-
Identity
```

The foregoing assumes that all RRC signaling relating to both the macro and small cells are sent by the macro eNB 104 to a UE. As an alternative, the RRC signaling can be divided between the macro cell and the small cell. For RRC signaling carrying a non-access stratum (NAS) control message, the RRC signaling is sent from or to the macro eNB 104 directly. NAS refers to a stratum of a control plane between the UE and the core network. NAS control messaging is used to support mobility of a UE and to support session management procedures for establishing and maintaining Internet Protocol (IP) connectivity between the UE and a packet data network gateway. The NAS control messaging can include a paging message, a message relating to a tracking area update, and so forth.

For RRC signaling carrying radio link management information, two sets of RRC signaling are defined: a first set is sent from macro eNB 104 for managing the radio link between macro eNB 104 and the UE; and a second set is sent from the LeNB 108-1 for managing the radio link between the LeNB 108-1 and the UE.

For uplink scheduling, the logicalChannelConfig information element is again defined separately for the macro cell uplink and the small cell uplink. The logicalChannelConfig information element for the macro cell uplink is carried in RRC signaling from the macro eNB 104, while the logicalChannelConfig information element for the small cell uplink is carried in RRC signalling from the LeNB 108-1. Using the two logicalChannelConfig information elements, the uplink scheduler in the UE knows to which wireless uplink (macro cell uplink or small cell uplink) to send uplink data of each logical channel, and manages the two uplinks separately in terms of priorities and prioritized bit rates.

For RRC signaling sent from the LeNB 108-1, the following are some example changes that are made to existing RRC messages. Generally, RRC signaling is modified to reflect the fact that SRBs do not exist in the wireless connection between the LeNB 108-1 and the UE. For example, the following elements can be deleted from RRC signaling sent from the LeNB 108-1 to the UE:

```
srb-ToAddModList         SRB-ToAddModList        OPTIONAL,
-- Cond HO-Conn.
SRB-ToAddModList ::=     SEQUENCE (SIZE (1..2)) OF SRB-ToAddMod
SRB-ToAddMod ::=         SEQUENCE {
  srb-Identity              INTEGER (1..2),
  rlc-Config                CHOICE {
    explicitValue               RLC-Config,
    defaultValue                NULL
  } OPTIONAL,                                          -- Cond
Setup
  logicalChannelConfig      CHOICE {
    explicitValue               LogicalChannelConfig,
    defaultValue                NULL
  } OPTIONAL,                                          -- Cond
Setup
  ...
```

Also, depending on the point at which the user plane protocol stack is split between the macro eNB 104 and the LeNB 108-1, the LeNB 108-1 may not see certain protocol layer headers (e.g. EPS bearer header, PDCP header, RLC header, etc.). As a result, the following elements can be removed from RRC signaling sent from the LeNB 108-1 to the UE:

```
eps-BearerIdentity    INTEGER (0..15)    OPTIONAL,   -- Cond
DRB-Setup
  drb-Identity          DRB-Identity,
  pdcp-Config           PDCP-Config        OPTIONAL,   --
Cond PDCP
  rlc-Config            RLC-Config         OPTIONAL,   --
Cond Setup.
```

System Architecture

Figure 4:
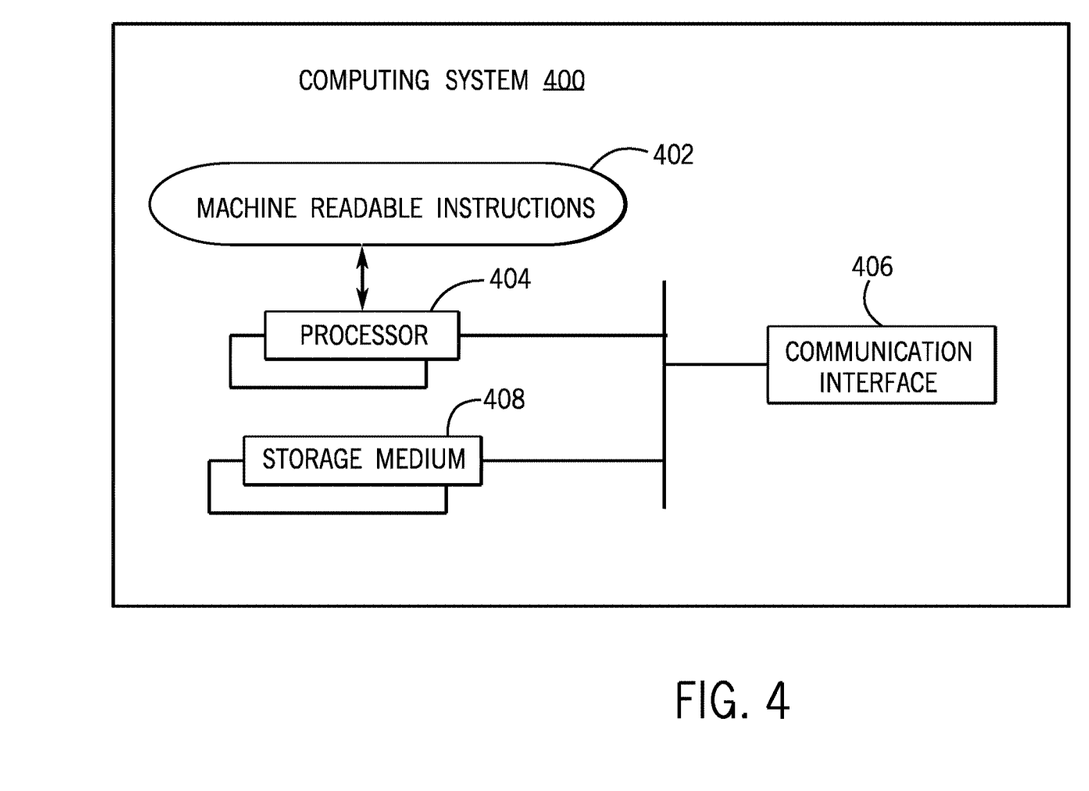
FIG. 4 is a block diagram of a computing system that can incorporate some implementations.

FIG. 4 depicts a computing system 400, which can be any of the UE 110, macro eNB 104, LeNB 108, or control node 120. The computing system 400 includes machine-readable instructions 402, which are executable on a processor (or multiple processors) 404 to perform various tasks discussed above. A processor can include a microprocessor, microcontroller, processor module or subsystem, programmable integrated circuit, programmable gate array, or another control or computing device.

The processor(s) 404 can be coupled to a communication interface 406 to perform communications. For example, the communication interface 406 can perform wireless communicate over an air interface, or perform wired communication over a wired connection. In some cases, the computing system 400 can include multiple communication interfaces 406 to communicate with respective different network nodes.

The processor(s) 404 can also be coupled to a computer-readable or machine-readable storage medium (or storage media) 408, for storing data and instructions. The storage medium or storage media 408 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for wireless communication, comprising:
    setting, by a first wireless access network node, a data rate for communication of data between a second wireless access network node and a user equipment (UE), wherein the UE is concurrently wirelessly connected to the first wireless access network node and the second wireless access network node;
    sending, by the first wireless access network node to the second wireless access network node, an offload message containing information including the data rate for use by the second wireless access network node in controlling data communication between the second wireless access network node and the UE, wherein the data rate is derived from an aggregate data rate, wherein a first portion of the aggregate data rate includes the data rate for the communication of a first traffic data between the second wireless access network node and the UE offloaded from the first wireless access network node to the second wireless access network node using the offload message, and wherein a second, different portion of the aggregate data rate is used to control communication of a second traffic data between the first wireless access network node and the UE that is concurrently connected to the first and second wireless access network nodes and communicating the first and second traffic data with the respective first and second wireless access network nodes; and
    computing the first portion of the aggregate data rate based on a proportion of a traffic statistic representing a traffic characteristic of traffic carried by the second wireless access network node relative to a traffic statistic representing a traffic characteristic of traffic carried by the first wireless access network node.

2. The method of claim 1, wherein the information sent to the second wireless access network node includes: the data rate, and an indication how the data rate is applied.

3. The method of claim 1, wherein the data rate is an aggregate maximum bit rate for the UE.

4. The method of claim 1, further comprising: determining, by the first wireless access network node, whether to offload a bundle of dedicated bearers to the second wireless access network node or to handle the bundle of dedicated bearers at the first wireless access network node.

5. The method of claim 4, wherein the bundle of dedicated bearers includes a bundle of dedicated non-guaranteed bit rate (non-GBR) bearers, wherein the data rate is allocated to the bundle of non-GBR bearers.

6. The method of claim 1, further comprising:
    keeping at least one default bearer of the UE at the first wireless access network node; and
    carrying a bundle of dedicated bearers of the UE using the second wireless access network node, wherein the data rate is allocated to the bundle of dedicated bearers.

7. The method of claim 6, wherein the second portion of the aggregate date rate is allocated to the at least one default bearer.

8. The method of claim 6, wherein the bundle of dedicated bearers is a bundle of dedicated non-guaranteed bit rate (non-GBR) bearers, and the at least one default bearer is at least one default non-GBR bearer.

9. The method of claim 1, wherein the second wireless access network node is associated with a coverage area that is within a coverage area provided by the first wireless access network node.

10. The method of claim 1, wherein the aggregate data rate is a total UE-aggregate maximum bit rate (UE-AMBR) for data communication with the UE, and the data rate indicated by the information sent from the first wireless access network node to the second wireless access network node is a first UE-AMBR for controlling wireless data communication between the second wireless access network node and the UE, the method further comprising:
    deriving, by the first wireless access network node, a second UE-AMBR for controlling wireless data communication between the first wireless access network node and the UE,
    wherein the first UE-AMBR and the second UE-AMBR are derived based on splitting the total UE-AMBR.

11. The method of claim 1, further comprising:
    controlling, by the first wireless access network node, establishing and removing a connection between the UE and the second wireless access network node.

12. The method of claim 1, wherein setting the data rate accounts for an amount of header of a protocol layer in a protocol stack for communicating the data.

13. The method of claim 1, further comprising: sending, by the first wireless access network node, Radio Resource Control (RRC) messaging to the UE, the RRC messaging including an information element containing one or more of information relating to a data radio bearer of the second wireless access network node and information relating to a logical channel between the second wireless access network node and the UE.

14. A control node comprising: a first communication interface to communicate with a first wireless access network node; a second communication interface to communicate with a second wireless access network node; and at least one processor configured to:
　determine a first aggregate data rate for a user equipment (UE);
　determine a second aggregate data rate for the UE, wherein the determining of the first aggregate data rate and the second aggregate data rate is based on an overall aggregate data rate for the UE;
　compute the first aggregate data rate as a proportion of the overall aggregate data rate based on a proportion of a traffic statistic representing a traffic characteristic of traffic carried by the first wireless access network node relative to a traffic statistic representing a traffic characteristic of traffic carried by the second wireless access network node;
　send the first aggregate data rate to the first wireless access network node for controlling wireless data communication between the first wireless access network node and the UE; and
　send the second aggregate data rate to the second wireless access network node for controlling wireless data communication between the second wireless access network node and the UE.

15. The control node of claim 14, wherein the wireless data communication between the first wireless access network node and the UE comprises a bundle of dedicated non-guaranteed bit rate (non-GBR) bearers.

16. The control node of claim 15, wherein the wireless data communication between the second wireless access network node and the UE comprises a default non-GBR bearer.

17. A first wireless access network node comprising: a communication interface to communicate with a second wireless access network node, and at least one processor configured to:
　receive, from the second wireless access network node, an offload message containing information including a first data rate, the first data rate being set by the second wireless access network node based on splitting an aggregate data rate into:
　the first data rate for controlling wireless traffic data communication between the first wireless access network node and a user equipment (UE), the first data rate computed as a proportion of the aggregate data rate based on a proportion of a traffic statistic representing a traffic characteristic of traffic carried by the first wireless access network node relative to a traffic statistic representing a traffic characteristic of traffic carried by the second wireless access network node, and
　a second data rate for controlling wireless traffic data communication between the second wireless access network node and the UE that is concurrently connected to the first and second wireless access network nodes and communicating wireless first and second traffic data with the respective first and second wireless access network nodes; and control data communication between the first wireless access network node and the UE using the information including the first data rate.

* * * * *